(12) United States Patent
Anghel et al.

(10) Patent No.: US 7,952,331 B2
(45) Date of Patent: May 31, 2011

(54) SELF-EXCITED CONTROLLED FREQUENCY GENERATOR SYSTEM WITH BI-DIRECTIONAL CONVERTER

(75) Inventors: Cristian Anghel, Oro Valley, AZ (US); Ming Xu, Oro Valley, AZ (US); Parsa Mirmobin, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 554 days.

(21) Appl. No.: 12/143,011

(22) Filed: Jun. 20, 2008

(65) Prior Publication Data

US 2009/0315522 A1 Dec. 24, 2009

(51) Int. Cl.
*H02P 9/10* (2006.01)
*H02P 9/14* (2006.01)

(52) U.S. Cl. .......................................... 322/29; 332/59

(58) Field of Classification Search .................. 322/19, 322/22, 24, 28, 29, 59, 99; 290/7, 40 A
See application file for complete search history.

(56) References Cited

U.S. PATENT DOCUMENTS

| | | | | |
|---|---|---|---|---|
| 4,743,777 A | * | 5/1988 | Shilling et al. ................. | 290/46 |
| 5,587,647 A | * | 12/1996 | Bansal et al. ................... | 322/45 |
| 6,611,437 B2 | * | 8/2003 | Kawazoe et al. ............... | 363/37 |
| 6,778,414 B2 | | 8/2004 | Chang et al. | |
| 6,958,550 B2 | | 10/2005 | Gilbreth et al. | |
| 7,122,994 B2 | * | 10/2006 | Anghel et al. .................. | 322/60 |
| 7,184,927 B2 | * | 2/2007 | Anghel et al. ........... | 318/400.04 |
| 7,400,056 B2 | * | 7/2008 | McGinley et al. .............. | 290/46 |
| 7,508,086 B2 | * | 3/2009 | Huang et al. .................... | 290/31 |
| 7,592,786 B2 | * | 9/2009 | Xu et al. .......................... | 322/59 |
| 7,598,623 B2 | * | 10/2009 | Fattal et al. ................. | 290/40 F |
| 7,687,929 B2 | * | 3/2010 | Fattal .......................... | 290/40 C |
| 7,821,145 B2 | * | 10/2010 | Huang et al. .................... | 290/31 |

FOREIGN PATENT DOCUMENTS

WO   WO 2007135573   11/2007

* cited by examiner

*Primary Examiner* — Nicholas Ponomarenko
(74) *Attorney, Agent, or Firm* — Miriam Jackson, Esq.

(57) ABSTRACT

A controlled frequency generating system (CFG) may be constructed with a main generator and an exciter driven by a common shaft. Excitation power may be provided from the common shaft; as distinct from prior-art systems which may require independent excitation power sources. While controlling the output voltage and frequency of the main generator, the bi-directional controller extracts power from a main generator output and may supply the extracted power to supplement excitation power when needed at certain rotational speeds. The controller may extract power from the exciter when, at other rotational speeds, the exciter produces excess power. The extracted excess power may be delivered to the output of the main generator to maintain a desired level of output power at a desired frequency, irrespective of speed of rotation of the CFG.

20 Claims, 7 Drawing Sheets

SELF-EXCITED CONTROLLED FREQUENCY GENERATOR SYSTEM WITH BI-DIRECTIONAL CONVERTER

BACKGROUND OF THE INVENTION

The present invention is in the field of control of electrical machines and, more particularly, control of electrical machines employed for generating controlled-frequency electrical power with a variable-speed engine.

Current aircraft electrical generators are required to produce power at a constant frequency of 400 Hz, even though an aircraft engine to which the generator system is attached has variable speed. The traditional solution is to use a hydro-mechanical transmission to convert the variable engine speed to a constant speed at the generator input shaft. A typical hydro-mechanical transmission may be large, heavy and expensive. Aircraft owners would prefer to have a smaller, lighter, and less costly alternative.

This has led to development of controlled frequency generators (CFG's) that can be set to have a constant output frequency irrespective of their shaft speed. Prior art CFG's may require use of a separate source of frequency-controlled excitation power. Because CFG's are required to operate over a wide speed range, the prior-art excitation power source must have capability for delivering a widely varying amount of excitation power to an exciter power controller (EXPC). Such prior-art separate excitation power sources may consume space and add weight to an aircraft.

Additionally, in some modes of operation of the prior-art CFG, power needs may change direction so that power may flow out from an excitation winding of the CFG into the EXPC and from there to the excitation power source in the power system. When load-off events occur, transients may arise in prior-art CFG's. Accurate control may be difficult to accomplish when such transients develop.

As can be seen, there is a need to eliminate a requirement for a separate source of excitation power in a CFG. Additionally, there is a need to provide ease of transient control for a CFG or eliminate a need for such control.

SUMMARY OF THE INVENTION

In one aspect of the present invention a controlled frequency generating system (CFG) comprises a main generator and an exciter driven with a common shaft. A bidirectional controller extracts excitation power from an output of a main generator when the CFG operates at a rotational speed at which supplemental power input to the exciter stator is required. The bi-directional controller extracts power from the exciter when the main generator operates at a rotational speed at which the exciter produces power in excess of excitation requirements.

In another aspect of the present invention a controller for maintaining a desired level of excitation in a controlled frequency generator system (CFG) comprises a first inverter interconnected with stator windings of a main generator of the CFG, and a second inverter interconnected with stator windings of an exciter of the CFG. The inverters are interconnected to bi-directionally transfer energy between the exciter stator windings and the main generator stator windings.

In still another aspect of the present invention a method for generating electrical power at a controlled frequency comprises the steps of driving an exciter and a main generator with a common shaft, determining, on the basis of rotational speed of the shaft, a proper level of excitation required to maintain a desired frequency and voltage magnitude; and directing some main-generator power to provide supplementary excitation power when a rotational speed produces excitation power that is less than a desired level of excitation.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in operating CFG's. More particularly, the present invention may provide control for a CFG operating at a variable speed. The present invention may be particularly useful in aircraft and aerospace vehicles which employ such CFG's as sources of electrical power.

In contrast to prior-art CFG's, which employ separate sources of excitation power, the present invention may, among other things, provide excitation power from mechanical energy extracted from a main shaft of the CFG. The present invention may employ a bidirectional excitation controller to, depending on speed of the CFG, direct power from a main generator to an exciter or alternatively direct power from the exciter to an output of the main generator. The bidirectional controller may facilitate smooth transitions between various speed ranges of the CFG. Undesirable abrupt transient conditions may be reduced. Consequently, transient response of the inventive CFG may be readily controlled.

Figure 1:
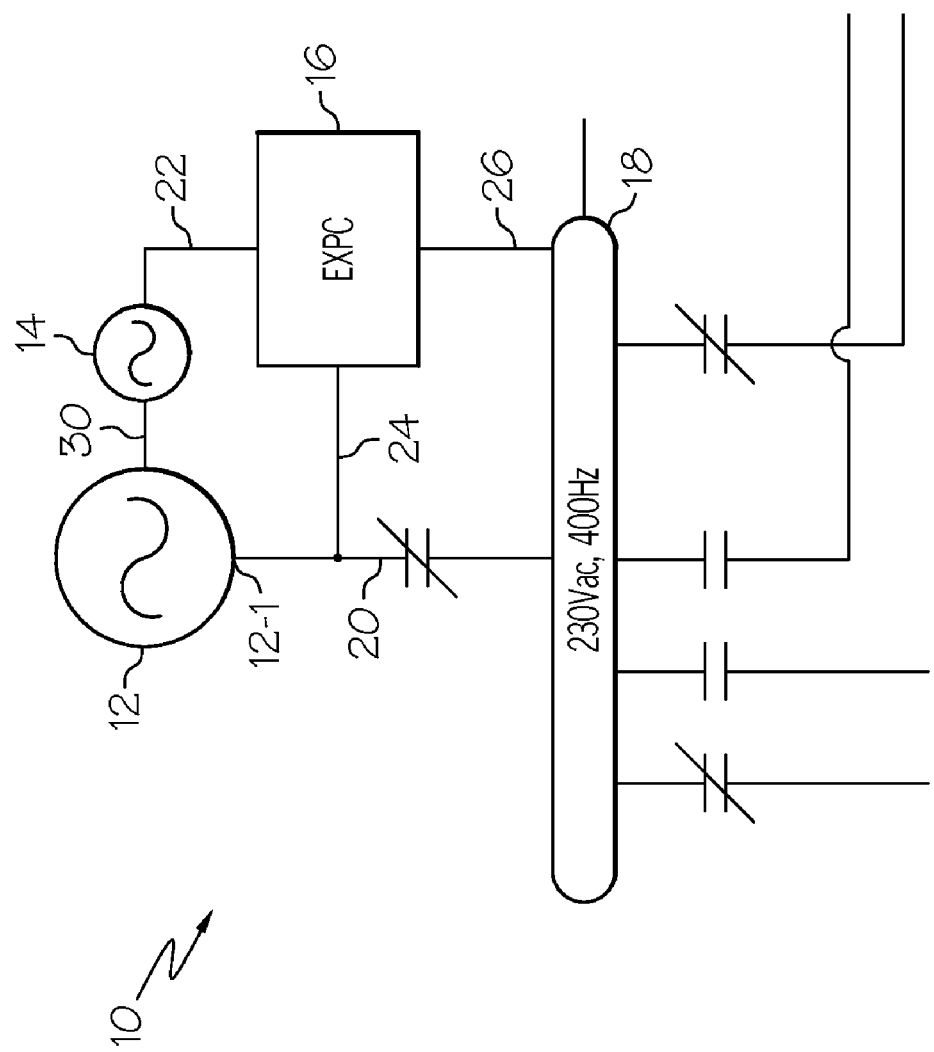
FIG. 1 is a block diagram of a controlled frequency generating system (CFG) in accordance with the invention.

Referring now to FIG. 1, a CFG is designated generally by the numeral 10. The CFG 10 may comprise a main generator 12, an exciter 14 and EXPC 16. An output 12-1 of the main generator 12 may be connected to a main power bus 18 through a current path 20. The EXPC 16 may be connected to the exciter 14 through a current path 22, to the main generator output 12-1 through a current path 24 and to the main power bus 18 through a current path 26. The main generator 12 and the exciter 14 may be driven with a common shaft 30.

In an exemplary embodiment, the CFG 10 may comprise an electrical power source for an aircraft (not shown). The CFG system 10 may use a rotor winding scheme as described in pending U.S. patent application Ser. No. 11/962,672, filed Dec. 21, 2007, which application is incorporated by reference herein. In such a rotor winding scheme there may be a plurality of windings with two phases, which are 90 degrees apart in space and 90 degrees shifted electrically. Rotor flux may be controlled to rotate at a speed that creates a desired frequency of output power (e.g. 400 Hertz [Hz]).

Figure 2:
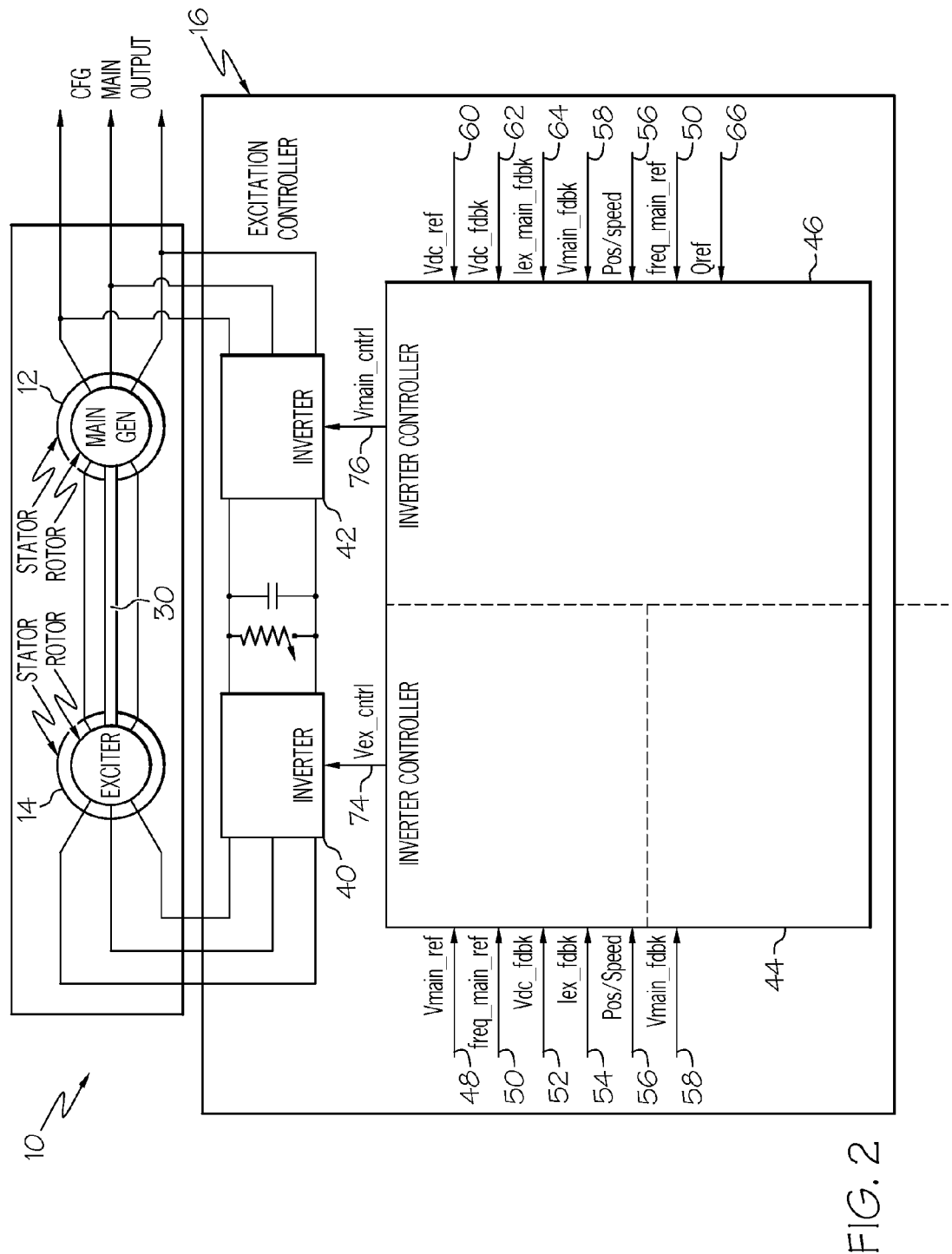
FIG. 2 is a block diagram of a control system in accordance with the invention.

Referring now to FIG. 2, the CFG 10 is shown in more detail. It may be seen that the EXPC 16 may comprise an inverter 40 connected to the exciter 14 and an inverter 42 connected to the main generator 12. The EXPC 16 may also comprise a control block 44 for providing control signals to the inverter 40 and a control block 46 for providing control signals to the inverter 42.

The control block 44 may be provided with input data relating to various parameters. For example, the control block 44 may be provided with input signals 48 through 58. Signal 48 (Vmain_ref) may comprise reference voltage of the main generator 12. Signal 50 (Freq-main_ref) may comprise reference frequency of the main generator 12. Signal 52 (Vdc-fdbk) may comprise feedback of DC voltage. Signal 54 (Id-c_fdbk) may comprise feedback of DC current. Signal 56 (pos/speed) may comprise position and/or speed of rotation of the main generator 12. Signal 58 (Vmain_fdbk) may comprise feedback of voltage of main generator 12.

The control block 46 may also be provided with input data relating to various parameters. For example, the control block 46 may be provided with signals 50, 56, 58 and 60 through 66. Signal 60 (Vdc_ref) may comprise a dc reference voltage. Signal 62 (Vdc_fdbk) may comprise feedback of DC voltage. Signal 64 (Iex-main_fdbk) may comprise feedback of current passing from the exciter 14 to the main generator 12. Signal 58 (Vmain_fdbk) may comprise the feedback of voltage of main generator 12. Signal 56 (pos/speed) may comprise position and/or speed of rotation of the main generator 12. Signal 50 (Freq-main_ref) may comprise reference frequency of the main generator 12. Signal 66 (Qref) may comprise reference reactive power.

In operation, the control block 44 may utilize set points from the signals 48, (Vmain_ref) and 50, (Freq-main_ref) along with feedback signal 52, 54, 56 and 58 to provide a control signal 74 to the inverter 40. In this regard the control block 44 may control output frequency and magnitude of voltage supplied by the inverter 40.

The control block 46 may utilize set points from the signal 60 (Vdc_ref), 50 (Freq-main_ref) and 66 (Qref) along with feedback signals 62, 64, 56 and 58 to provide a control signal 76 to the inverter 42. The control block 46 may control output magnitude and phase of voltage supplied by the inverter 42. This control may be achieved by sensing magnitude and phase of output voltage of the main generator 12. The inverter 42 may be controlled to provide matching magnitude and phase. At the same time reactive power (Q) may be minimized.

Figure 3:
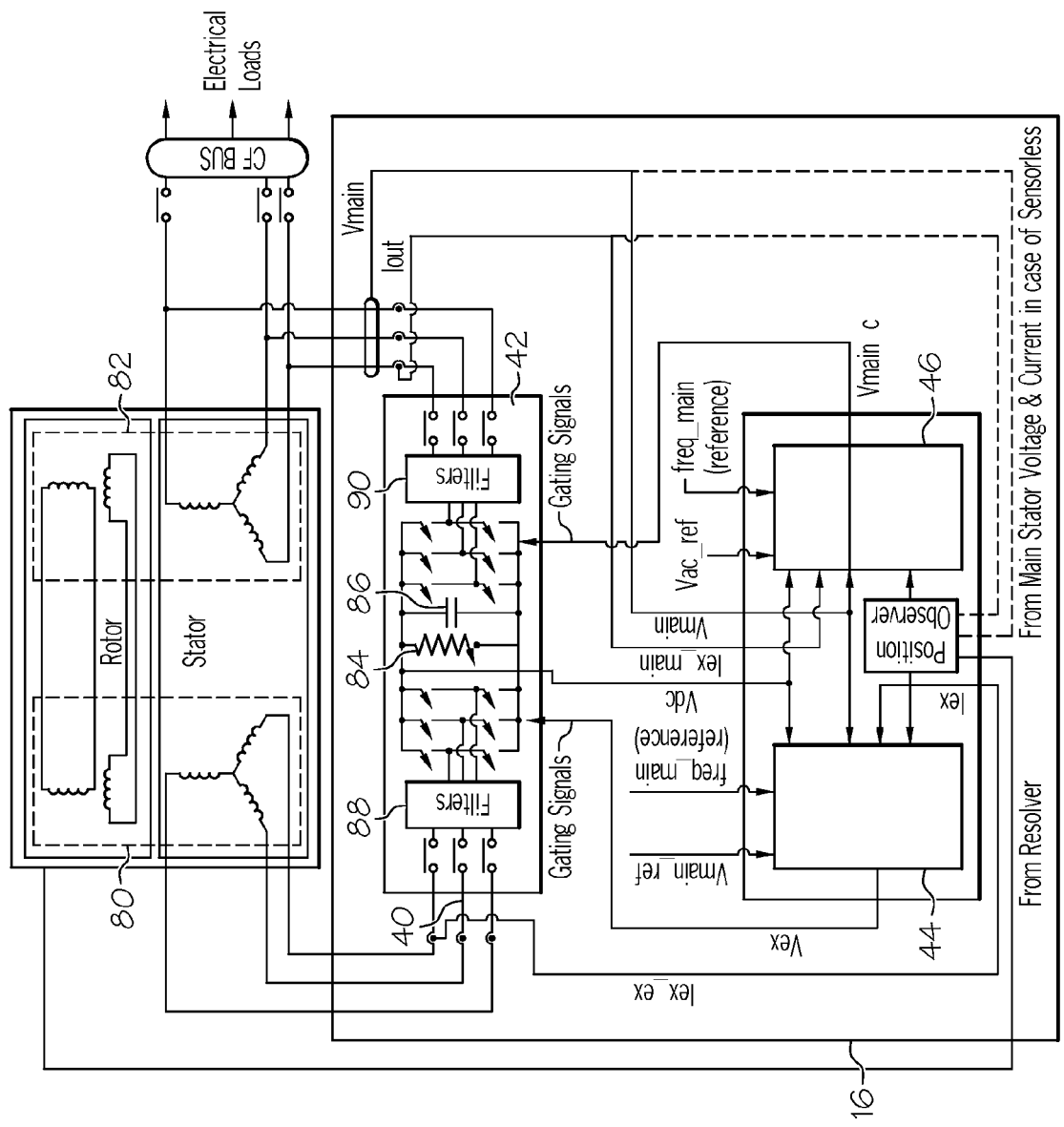
FIG. 3 is a block diagram of an interconnection arrangement for the control system of FIG. 2 in accordance with the invention.

Referring now to FIG. 3, an interconnection diagram for the CFG 10 is shown. It may be seen that stator windings 80 of the exciter 14 may be interconnected with the inverter 40 via input/output filters 88. Stator windings 82 of the main generator 12 may be interconnected with the inverter 42 via input/output filters 90. Interconnection between inverters 40 and 42 may include a bulk DC link capacitor 86 and a discharge resistor and switch combined as a dynamic brake 84.

The inverters 40 and 42 may function as voltage source inverters (VSI's) with current control. The inverters 40 and 42 may each perform fast inner-loop current controlling which may be implemented in a typical direct-quadrature (D-Q) vector control frame. For the inverter 42, gate driving may be performed to control D-Q currents so that output voltage of the inverter 42 may be identical in magnitude and phase with the output 12-1 of the main generator 12. At the same time, reference D-axis current may be set to zero to force reactive power to zero.

Figure 4:
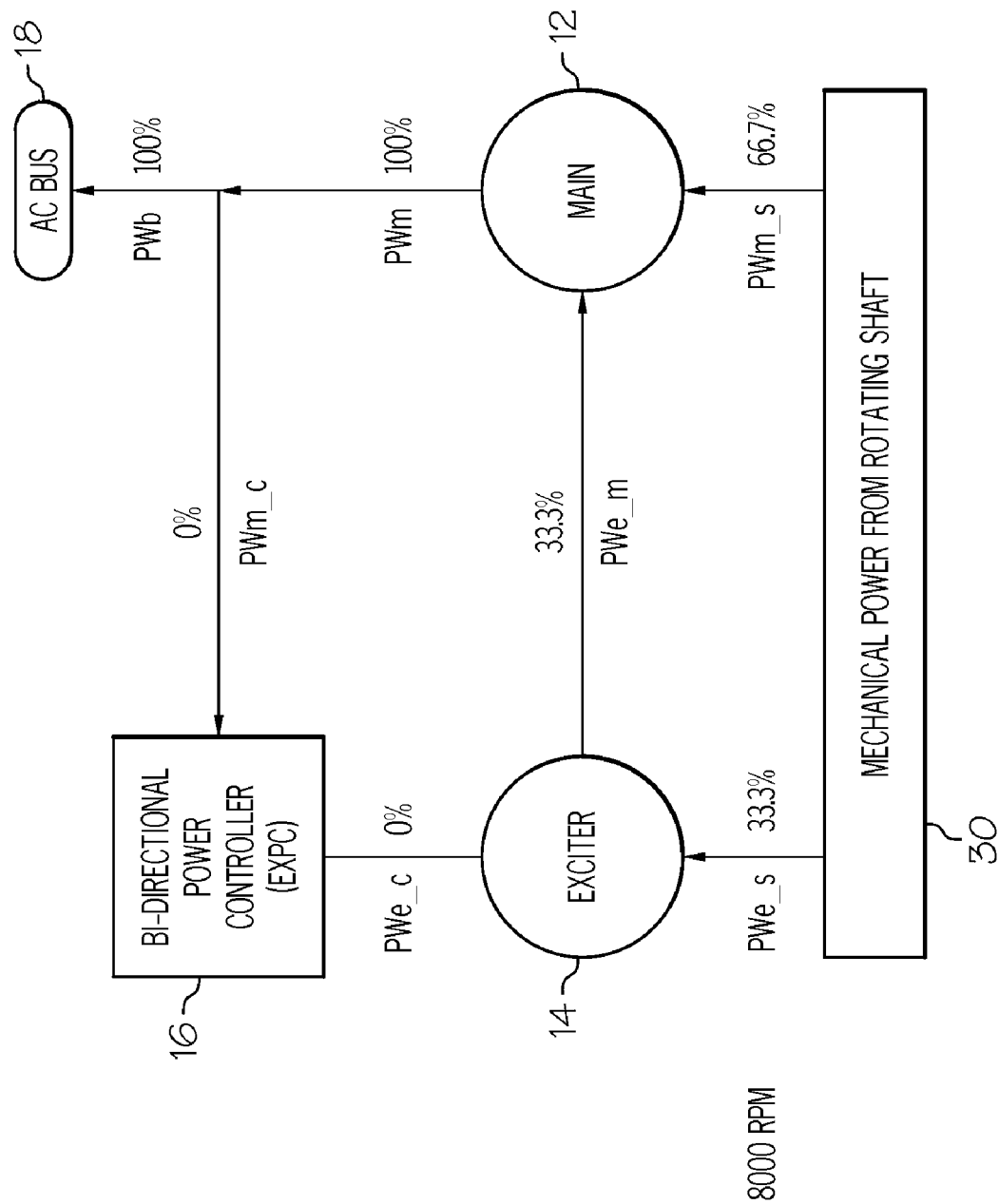
FIG. 4 is a block diagram showing an energy flow pattern for a first rotational speed of the CFG in accordance with the invention.
Figure 5:
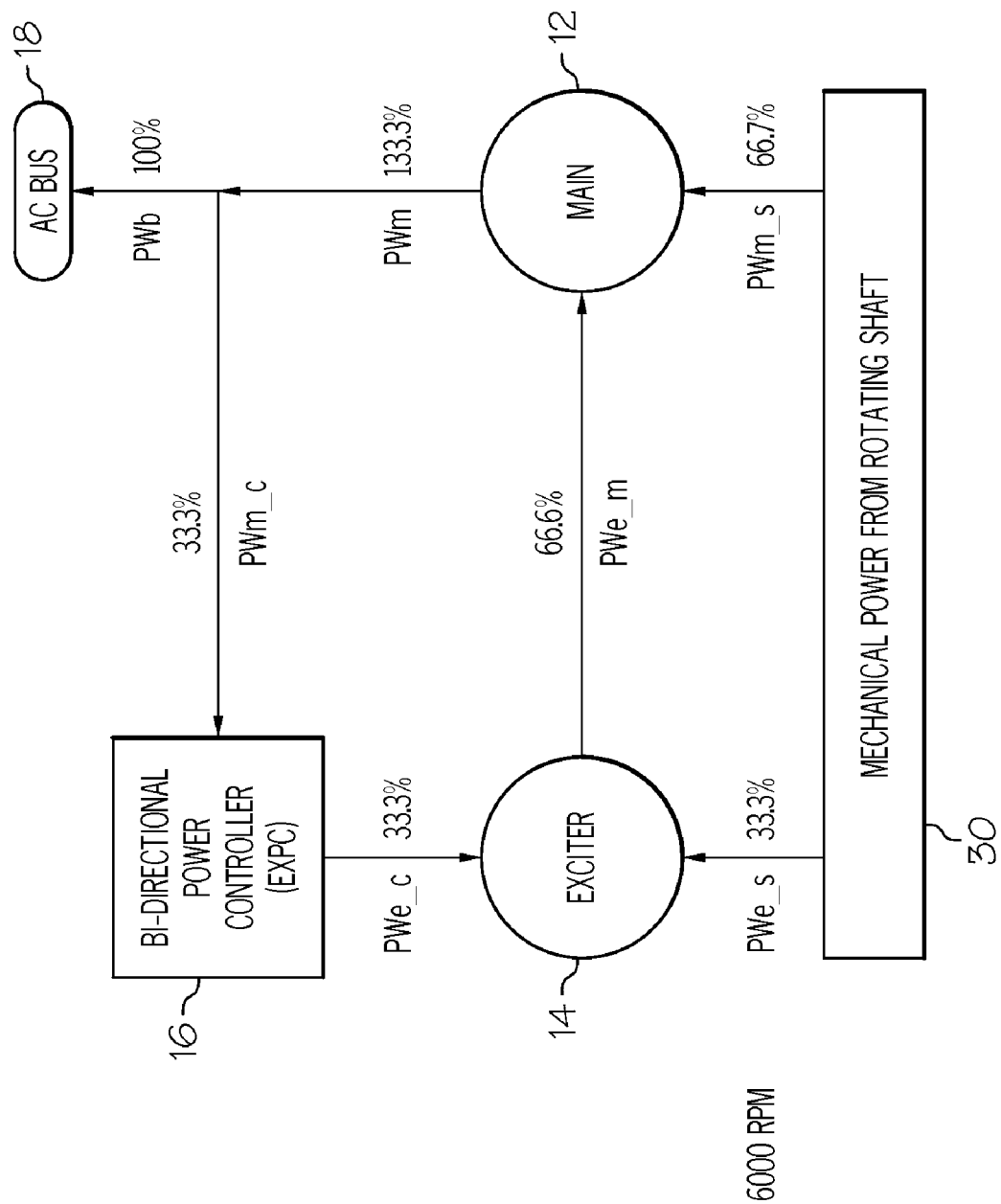
FIG. 5 is a block diagram showing an energy flow pattern for a second rotational speed of the CFG in accordance with the invention.
Figure 6:
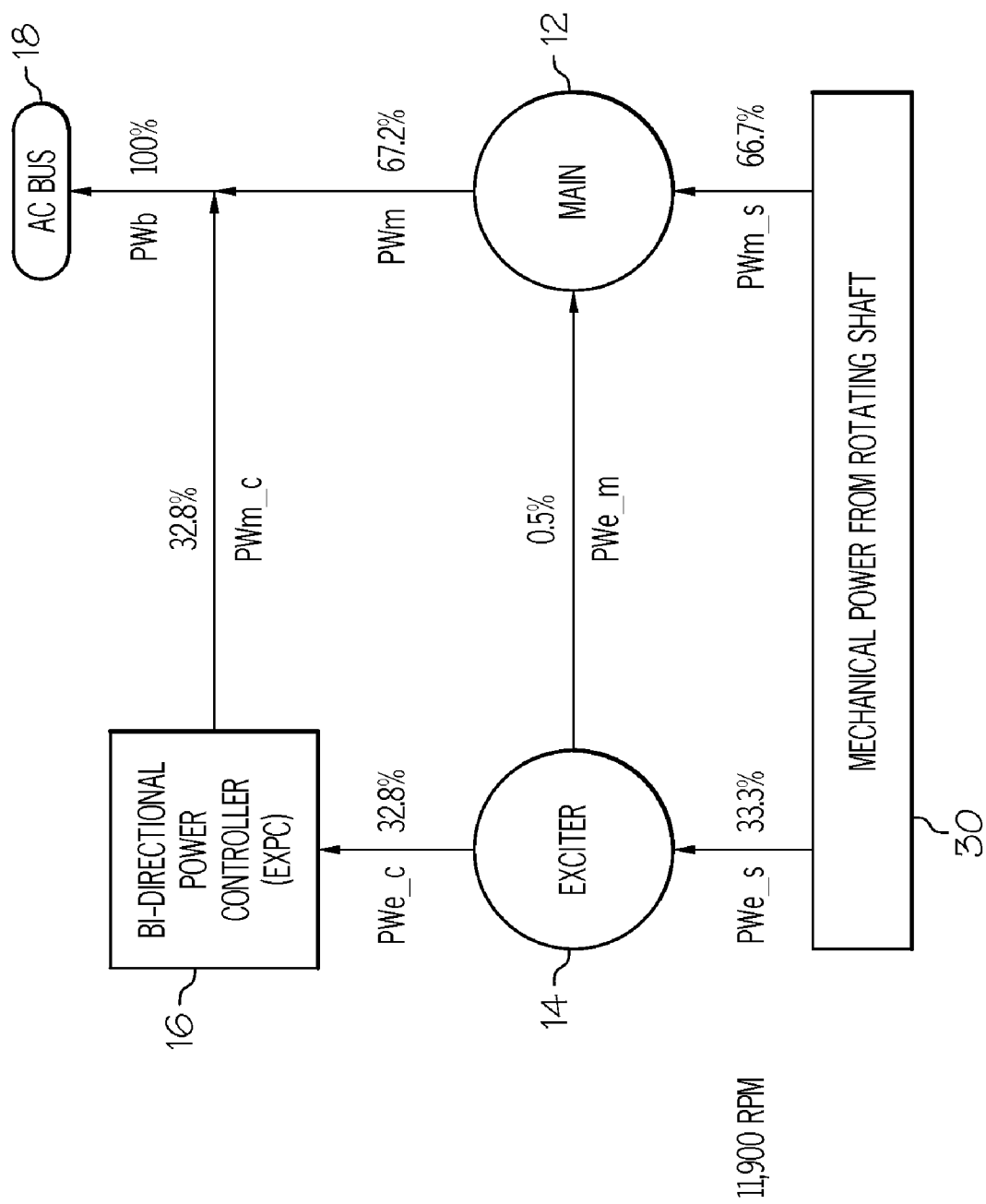
FIG. 6 is a block diagram showing an energy flow pattern for a third rotational speed of the CFG in accordance with the invention.

For the inverter 40, D-axis current and Q-axis current may be controlled to maintain a desired magnitude and frequency at the output 12-1 of the main generator 12. In this context, the exciter 12 may be provided with power input or power extraction (PWe_c) in accordance with the following expression:

$$PWe\_c = \{[Ns \times Pm]/[N \times (Pm+Pe)] - 1\} \times PWshaft \quad (\text{eqn.1})$$

where:
Ns is the synchronous speed of the main generator;
N is the mechanical speed of a shaft of the main generator;
Pm is the pole number of the main generator
Pe is the pole number of the exciter; and
PWshaft is mechanical power available from a main shaft Referring now to FIGS. 4 through 6, the effects of implementing the control system described above may be understood. FIGS. 4 through 6 may symbolically illustrate energy flow between and among various components of an illustrative embodiment of the inventive CFG 10. In the particular embodiment illustrated in FIGS. 4 through 6, the CFG 10 may have a synchronous speed of 12,000 revolutions per minute (RPM), the exciter 14 may have two poles and the main generator 12 may have four poles.

FIG. 4 may illustrate a particular operating speed of 8,000 RPM. At 8,000 RPM, the CFG 10 may be capable of providing power to the bus 18 directly from the main generator 12. In other words, power to the bus (PWb) may be equal to power from the main generator (PWm). PWm may be comprised of two sources of energy. Some of the power (PWm) may be extracted directly from the shaft 30 (PWm_s) and some may be provided by the exciter, (PWe_m). The exciter 14 may extract 33.3% of the total bus power PWb from the shaft 30. This exciter-extracted power may be referred to as PWe_s. It may be seen that at 8,000 RPM, PWe_s and PWe_m may be equal. As a consequence, the bidirectional EXPC 16 may be in a state of neither supplying power to the exciter 14 nor extracting power from the exciter 14.

FIG. 5 may illustrate energy flow of the illustrative CFG 10 at rotational speed 6,000 RPM. At 6,000 RPM, the main generator 12 may provide power PWm that may be 133.3% of the desired bus power PWb. This is because, as compared to 8,000 RPM operation, the exciter power PWe_m may deliver to the main generators up to 66.6% of the desired bus power PWb. In this 6,000 RPM case, the EXPC 16 may extract some of the main generator output power PWm. This extracted power may be referred to as PWm_c and may have a magnitude of about 33.3% of the desired bus power PWb. Thus, even though PWm may exceed a desired PWb, excess energy does not find its way to the bus 18.

The EXPC 16 may direct the extracted power PWm_c and deliver it to the exciter 14 as power PWc_e. It may be seen the sum of PWc_e and PWe_s may be equal to PWe_m, i.e. the power provided to the main generator 12 by the exciter 14. It may also be seen that power extracted from the shaft 30 by the exciter 14 and the main generator 12 may remains the same as the that extracted in the 8,000 RPM case (i.e. PWe_s @6,000 RPM=PWe_s @8,000 RPM; and PWm_s @6,000 RPM=PWm_s @8,000 RPM).

FIG. 6 may illustrate energy flow of the illustrative CFG 10 at rotational speed 11,900 RPM. At 11,900 RPM, the main generator 12 may provide power PWm that may be only 67.2% of the desired bus power PWb. This is because, as compared to 8,000 RPM operation, the exciter power PWe_m may deliver to the main generators about 0.5% of the desired bus power PWb. In this 11,900 RPM case, the EXPC 16 may extract some power from the exciter 14 (i.e., PWe_c). This extracted power may be provided directly to the bus 18 or the output 12-1 of the main generator 12 to supplement PWm. The extracted power which is delivered directly to the bus 18 may be referred to as PWc_m. The extracted power PWc_e and PWc_b may have a magnitude of about 32.8% of the desired bus power PWb. Thus, even though PWm may be less than a desired PWb, a full value of PWb (i.e. 100%), may reach the bus 18.

It may be seen the sum of PWm_c and PWm may be equal to 100% of PWb. It may also be seen that power extracted from the shaft 30 by the exciter 14 and the main generator 12 are the same as that extracted in the 8,000 RPM and 6,000 RPM cases. This is because 11,900 RPM is a speed that is close to the 12,000 RPM synchronous speed of the illustrative CFG 10. But, at synchronous speed, PWe_m may become zero and thus may represent a limiting operating condition for the illustrative CFG 10.

It may also be seen that for all of the illustrated speeds of FIGS. 4 through 6, the bus power PWb may be derived exclusively from the shaft 30. In other words, there may be no need to provide power to the exciter 14 or the EXPC 16 from any power source other than the shaft 30.

Referring back now to equation 1 and to FIG. 3, it may be seen that whenever PWe_c is positive, power may flow from the EXPC 16 into the exciter 14. Conversely, when the value of PWe_c is negative, power may flow from the exciter 14 into the controller 16 and ultimately into the bus 18 to supplement power from the main generator 12. In FIG. 3, it may be seen that a damping resistor 84 may reduce undesirable transient effects when current flow switches direction as rotational speed of the illustrative CFG 10 may change from being less than 8,000 RPM to being greater than 8,000 Rpm, or vice versa, or when load-off transients occur on the bus 18. Additionally, it may be seen that filter sets 88 and 90 may be provided to reduce adverse effects of harmonics that they be generated by the inverters 40 and 42. It may also be noted that the bulk DC link capacitor 86 may function as a starting capacitor and may provide excitation current for a brief period to facilitate initial power production by the CFG 10 at start-up.

It may be seen that when the EXPC 16 is configured as described above, the CFG 10 may be considered to be self-excited. Thus the CFG 10 may have a capability to produce controlled output frequency and voltage, to synchronize the EXPC 16 to the output of the main generator 12 and to minimize (target is zero) reactive power.

Figure 7:
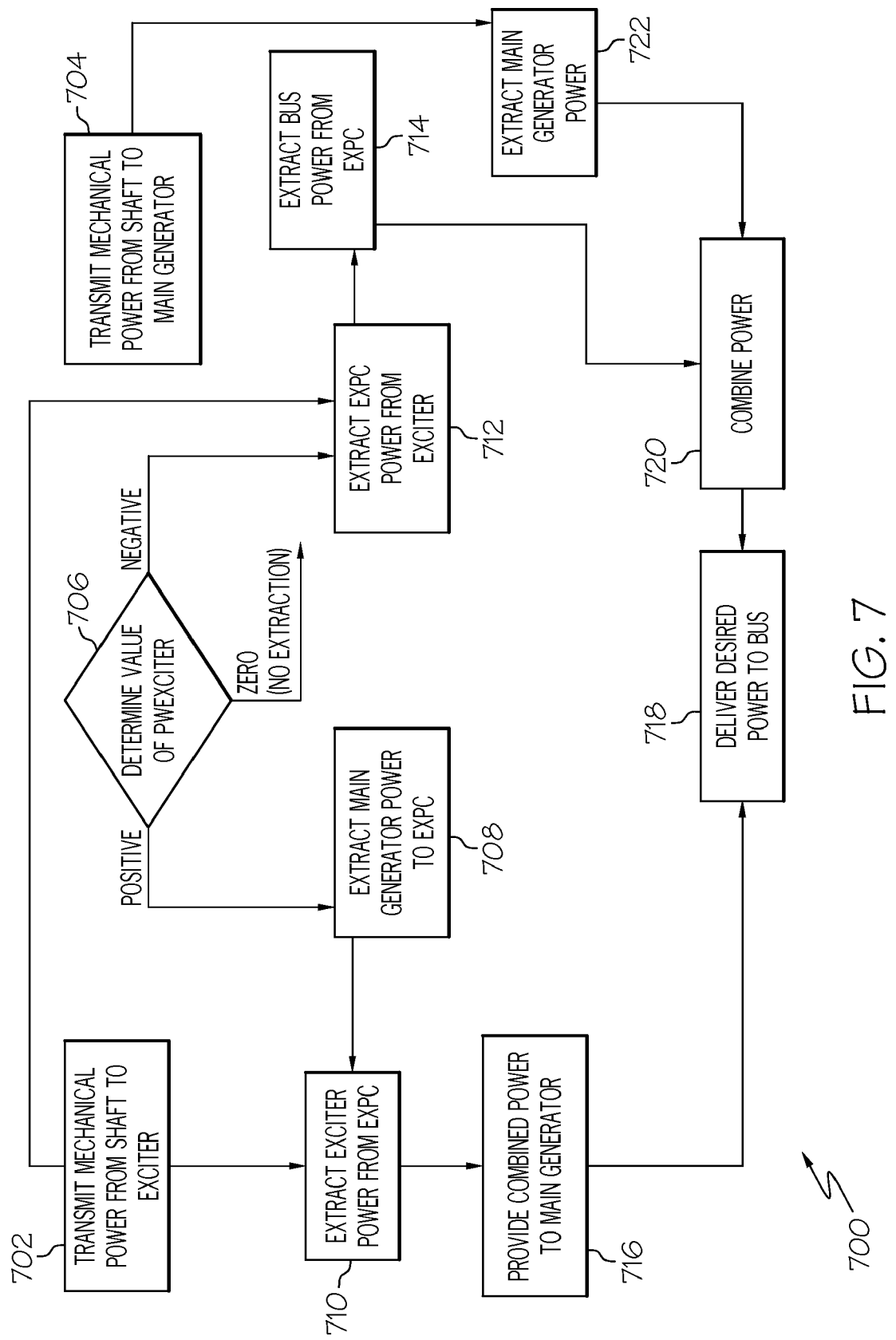
FIG. 7 is a flow chart of a method in accordance with the invention.

Referring now to FIG. 7, an exemplary method 700 for practicing the present invention is illustrated in a flow chart. In a step 702, mechanical power may be transmitted to an exciter of the CFG (e.g. the shaft 30 may supply mechanical energy to the exciter 14). In a step 704, mechanical power may be transmitted to a main generator of a controlled frequency generator (CFG) from a shaft (e.g., the shaft 30 may supply mechanical energy to the main generator 12).

In step 706 a controller may determine whether the exciter requires additional power or is producing excess power (e.g., based on speed of rotation of the CFG and equation 1, the EXPC 16, in the context of controlling frequency and output voltage of the CFG 10, may provide power to the exciter 14 to supplement power from the shaft 30. Or alternatively, the EXPC 16 may extract excess power from the exciter 14). In the event that a determination is positive, steps 708 and 710 may be initiated. In the event that the determination is nega-tive, steps 712 and 714 may be initiated. In the event of a zero determination all of the steps 708 through 714 may remain uninitiated.

In the case of a positive determination in step 706, the step 708 may be performed to extract power from a main generator of the CFG. Simultaneously, in a step 710, the extracted power may be supplied to the exciter by the controller. For example, the EXPC 16 may extract power from the main generator 12 and deliver the extracted power to the exciter 14 so that the exciter 14 may provide proper excitation of the main generator. In a step 716, mechanical power from step 702 may be combined with electrical power from step 710 (e.g., PWe_s may be combined with PWc_e to produce PWe_m). In a step 718, power from steps 704 and 716 may be combined to provide a desired power level at a bus to which the CFG may be connected (e.g., PWe_c may be added to PWm_s. But since PWm_c has been subtracted from PWm in step 708, PWm may be at a desired power level at the bus 18).

In the case of a negative determination in step 706, the step 712 may be performed to extract power from the exciter and provide the extracted power to the controller. Simultaneously, in the step 714, the extracted power of step 712 may be supplied directly to the bus. For example, the exciter 14 may extract an amount of power (PWe_s) from the shaft 30 which is in excess of an amount needed for proper excitation (PWe_m). This excess power (PWe_c) may be supplied directly to the bus 18. In a step 720, power from step 704 may be combined with power from step 714 and from a step 722 (wherein main generator electrical power may be extracted) to provide a desired level of power at the bus (e.g., PWm_c may be added to PWm because PWm by itself is not large enough to provided a desired power level at the bus 18).

In the case of a zero determination in step 706, there may be no requirement for energy transfer into or out from the controller. In other words, mechanical power to the exciter may be equal to required excitation power. Output of the main generator may then be equal to a desired power level at the bus.

It should be understood, of course, that the foregoing relates to exemplary embodiments of the invention and that modifications may be made without departing from the spirit and scope of the invention as set forth in the following claims.

We claim:

1. A controlled frequency generating system (CFG) comprising:
   a main generator;
   an exciter driven by a shaft common with the main generator;
   a bi-directional controller that extracts excitation power from an output of the main generator when the CFG operates at a rotational speed at which supplemental power input to the exciter is required; and
   the bi-directional controller extracts power from the exciter when the main generator operates at a rotational speed at which the exciter produces power in excess of excitation requirements.

2. The CFG of claim 1 wherein power extracted from the exciter is delivered to the output of the main generator.

3. The CFG of claim 1:
   wherein the bi-directional controller extracts power from the output of the main generator whenever a term PWexciter is positive; and
   wherein PWexciter is determined in accordance with the expression:

$PW\text{exciter} = \{[Ns \times Pm]/[N \times (Pm+Pe)] - 1\} \times PW\text{shaft}$ where:

Ns is the synchronous speed of the main generator;
N is the mechanical speed of a shaft of the main generator;
Pm is the pole number of the main generator;
Pe is the pole number of the exciter; and
PWshaft is the mechanical power of the shaft.

4. The CFG of claim 3 wherein excess exciter power is directed from the exciter to the output of the main generator when the term PWexciter is negative.

5. The CFG of claim 1 further comprising:
a first inverter interconnected with stator windings of the main generator of the CFG; and
a second inverter interconnected with stator windings of the exciter of the CFG, the inverters being interconnected to bi-directionally transfer energy between the exciter stator windings and the main generator stator windings.

6. The CFG of claim 5 wherein the first inverter is responsive to at least an input signal that is a function of:
a main generator reference voltage;
a main generator reference frequency;
a direct current (DC) feedback;
an exciter current feedback;
a rotor speed or position; and
a main generator voltage feedback.

7. The CFG of claim 5 wherein the second inverter is responsive to at least an input signal that is a function of:
a DC reference voltage;
a DC voltage feedback;
an exciter to main generator current feedback;
a main generator reference frequency;
a rotor speed or position;
a main generator voltage feedback; and
a reactive power reference.

8. The CFG of claim 1:
wherein the bidirectional controller controls extracted power such that a desired frequency and voltage of the CFG are maintained at a set value; and
wherein output of the bidirectional controller output is synchronized with the output of the main generator.

9. A controller for maintaining a desired level of excitation in a controlled frequency generator system (CFG), the controller comprising:
a first inverter interconnected with stator windings of a main generator of the CFG; and
a second inverter interconnected with stator windings of an exciter of the CFG,
the inverters being interconnected to bi-directionally transfer energy between the exciter stator windings and the main generator stator windings.

10. The controller of claim 9 further comprising a damping resistor positioned between the first and second inverters to dampen transient effects arising from bidirectional operation of the inverters or load transients on the bus.

11. The controller of claim 9 wherein energy is transferred from the exciter stator windings to an output of the main generator when the exciter is rotated at a speed that produces excitation power in excess of an amount required for excitation of the CFG.

12. The controller of claim 9 wherein energy is transferred from an output of the main generator to the exciter stator windings when the exciter is rotated at a speed at which excitation power requires supplementation for proper excitation of the CFG.

13. The controller of claim 9 wherein electrical power is extracted from an output of the main generator whenever excitation power requires supplementation, the amount of such supplementation being given by a term PWexciter; and
wherein PWexciter is positive and is determined in accordance with the expression:

$$PW\text{exciter} = \{[Ns \times Pm]/[N \times (Pm+Pe)] - 1\} \times PW\text{shaft}$$

where:
Ns is the synchronous speed of the main generator;
N is the mechanical speed of a shaft of the main generator;
Pm is the pole number of the main generator;
Pe is the pole number of the exciter;;
PWshaft is the mechanical power of the shaft.

14. The controller of claim 13 wherein excess exciter power is directed from the exciter to an output of the main generator when the term PWexciter is negative.

15. The controller of claim 9 further comprising:
a first control block for providing control signals to the first inverter;
the first control block being responsive at least to an input signal relating to:
a main generator reference voltage;
a main generator reference frequency;
a direct current (DC) feedback;
an exciter current feedback;
a rotor speed or position; and
a main generator voltage feedback;
a second control block for providing control signals to the second inverter; and
the second control block being responsive to at least an input signal relating to:
a DC reference voltage;
a DC voltage feedback;
an exciter to main current feedback;
a main generator reference frequency;
a rotor speed or position;
a main generator voltage feedback; and
a reactive power reference; and
the controller being responsive to at least one of the input signals such that output frequency and voltage of the CFG is controlled, synchronization is achieved and reactive power through the CFG is minimized.

16. The controller of claim 9 further comprising:
a capacitor positioned between the first and second inverters for providing filtering and initial excitation current at start-up of the CFG;
a first input/output harmonic filter set in the first inverter; and
a second input/output harmonic filter set in the second inverter.

17. A method for generating electrical power at a controlled frequency comprising the steps of:
driving an exciter and a main generator with a common shaft;
determining, on the basis of rotational speed of the shaft, a proper level of excitation required to maintain a desired frequency and voltage magnitude; and
directing a portion of electrical power generated by the main generator power to provide supplementary excitation power when a rotational speed produces excitation power that is less than the desired level of excitation.

18. The method of claim 17 further comprising the step of directing excess exciter power from the exciter to an output of the main generator when a second rotational speed provides exciter power in excess of an amount needed for a desired level of excitation.

19. The method of claim 17 wherein excitation power is supplemented whenever a term PWexciter is positive; and wherein PWexciter is determined in accordance with the expression:

$$PW_{exciter} = \{[Ns \times Pm]/[N \times (Pm+Pe)] - 1\} \times PW_{shaft}$$

where:
Ns is the synchronous speed of the main generator;
N is the mechanical speed of a shaft of the main generator;
Pm is the pole number of the main generator;
Pe is the pole number of the exciter; and
PWshaft is the mechanical power of the shaft.

20. The method of claim 19 wherein excess exciter power is directed from the exciter to an output of the main generator when the term PWexciter is negative.

* * * * *